(12) United States Patent
Chen et al.

(10) Patent No.: US 8,289,470 B2
(45) Date of Patent: Oct. 16, 2012

(54) DISPLAY MODULE AND ASSEMBLING METHOD THEREOF

(75) Inventors: Chun-Yuan Chen, Hsinchu (TW);
Chia-Hao Wu, Hsinchu County (TW);
Han-Ping Kuo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 204 days.

(21) Appl. No.: 12/915,042

(22) Filed: Oct. 29, 2010

(65) Prior Publication Data
US 2012/0069267 A1    Mar. 22, 2012

(30) Foreign Application Priority Data
Sep. 17, 2010    (TW) ................ 99131625 A (51) Int. Cl.
*G02F 1/1333*    (2006.01)
(52) U.S. Cl. ........................................ 349/58
(58) Field of Classification Search ............ 349/58
See application file for complete search history.

(56) References Cited

FOREIGN PATENT DOCUMENTS
TW        I317837        12/2009

*Primary Examiner* — Phu Vu
(74) *Attorney, Agent, or Firm* — Jianq Chyun IP Office (57) ABSTRACT

A display module includes a backlight unit, a display panel, a fixing film, a covering plate, and a bezel. The backlight unit has a top portion, a bottom portion opposite to the top portion, a first side, a second side opposite to the first side, a third side, and a fourth side opposite to the third side between the top and bottom portions. The display panel has a display surface and a back surface opposite to the display surface. The display panel is located on the top portion. The back surface of the display panel faces the top portion. The fixing film attached to the back surface extends toward the backlight unit and wraps the first and second sides and the bottom portion. The covering plate is disposed on the display surface of the display panel. The bezel connects the covering plate and exposes the first and second sides.

15 Claims, 10 Drawing Sheets

DISPLAY MODULE AND ASSEMBLING METHOD THEREOF

CROSS-REFERENCE TO RELATED APPLICATION

This application claims the priority benefit of Taiwan application serial no. 99131625, filed on Sep. 17, 2010. The entirety of the above-mentioned patent application is hereby incorporated by reference herein and made a part of this specification.

BACKGROUND OF THE INVENTION

1. Field of the Invention

The invention relates to a display module and an assembling method of the display module, and more particularly to a display module without sealant and an assembling method of the display module.

2. Description of Related Art

At present, 3C products on market, e.g., smart phones and portable interne devices (PID), are designed to have full touch interfaces. Without the conventional key pads, active areas of the 3C products are expanded. To further increase the active areas, slim border design has been developed.

The slim border design of a conventional smart phone is almost fully developed. Therefore, in order to further make the borders of the smart phone slim, traditional design rules must be revised or overthrown, or new design rules must be set. For instance, a frameless design can be applied in compliance with said requirement for slim border design, while vertical light leakage and large angle light leakage are likely to occur in a liquid crystal display module (LCM).

To be more specific, supporting structures that hold the display panel can be formed on a light guide plate (LGP) of a backlight unit in a frameless smart phone, so as to prevent an optical film of the backlight unit from being pressed and then damaged by the display panel. Nonetheless, said supporting structures often lead to convergence of light and light leakage.

SUMMARY OF THE INVENTION

The invention is directed to a display module that has the slim border design and prevents light leakage.

The invention is further directed to an assembling method of a display module. The assembled display module can have the slim border design and prevent light leakage.

The invention provides a display module that includes a backlight unit, a display panel, a fixing film, a covering plate, and a bezel. The backlight unit has a top portion, a bottom portion opposite to the top portion, a first side, a second side, a third side, and a fourth side. The first side, the second side, the third side, and the fourth side are located between the top portion and the bottom portion. The first side is opposite to the second side, and the third side is opposite to the fourth side. The display panel has a display surface and a back surface opposite to the display surface. The display panel is located on the top portion of the backlight unit, and the back surface of the display panel faces the top portion. The fixing film is attached to the back surface. Besides, the fixing film extends toward the backlight unit and wraps the first side, the second side, and the bottom portion of the backlight unit. The covering plate is disposed on the display surface of the display panel. The bezel is connected to the covering plate and exposes the first side and the second side of the backlight unit.

According to an embodiment of the invention, the bezel includes a bottom plate and two side walls. The bottom plate covers the bottom portion of the backlight unit and the fixing film on the bottom portion of the backlight unit. The two side walls are connected to the bottom plate and respectively located at the third side and the fourth side of the backlight unit. One end of each of the two side walls close to the covering plate extends and forms an ear-like portion, and the two ear-like portions are parallel to the covering plate and connected to the covering plate.

According to an embodiment of the invention, the backlight unit includes a light guide plate and a light emitting device. The light guide plate has a top surface, a bottom surface opposite to the top surface, a first side, a second side, a third side, and a fourth side. The first side is connected between the top surface and the bottom surface, and so are the second side, the third side, and the fourth side. The first side is opposite to the second side, and the third side is opposite to the fourth side. The fixing film wraps the first side, the second side, and the bottom surface of the light guide plate, and the bezel wraps the third side, the fourth side, and the bottom surface of the light guide plate. The light emitting device is located between the third side of the light guide plate and a corresponding one of two side walls of the bezel.

According to an embodiment of the invention, the backlight unit further includes an optical film disposed between the top surface of the light guide plate and the fixing film.

According to an embodiment of the invention, the backlight unit further includes a reflector disposed between the bottom surface of the light guide plate and the fixing film.

According to an embodiment of the invention, the fixing film has a first bending portion at an edge of the top portion of the backlight unit to form two side wings respectively wrapping the first side and the second side of the backlight unit. Each of the two side wings further has a second bending portion at an edge of the bottom portion of the backlight unit, and the second bending portions are respectively attached to the bottom portion of the backlight unit.

According to an embodiment of the invention, the first bending portion includes a first pre-bending line, and the second bending portion includes a second pre-bending line.

According to an embodiment of the invention, the first pre-bending line includes a first cutting notch extending along the first bending portion into the fixing film at a first depth without penetrating the fixing film, and the first depth is less than or equal to ½ of a total thickness of the fixing film. The second pre-bending line includes a second cutting notch extending along the second bending portion into the fixing film at a second depth without penetrating the fixing film, and the second depth is less than or equal to ½ of the total thickness of the fixing film.

According to an embodiment of the invention, the first pre-bending line includes a plurality of first cutting slots arranged along the first bending portion, and the first cutting slots penetrate the fixing film. The second pre-bending line includes a plurality of second cutting slots arranged along the second bending portion, and the second cutting slots penetrate the fixing film.

According to an embodiment of the invention, the display module further includes a first polarizer disposed between the display surface of the display panel and the covering plate.

According to an embodiment of the invention, the display module further includes a second polarizer disposed between the back surface of the display panel and the fixing film.

According to an embodiment of the invention, the fixing film is a polarizer.

The invention further provides an assembling method of a display module. In the assembling method, a display panel is provided. The display panel has a display surface and a back surface opposite to the display surface. A fixing film is attached to the back surface of the display panel. A length of the fixing film in a direction is greater than a length of the display panel in the direction, such that two opposite ends of the fixing film exceed the display panel. A covering plate is placed on the display surface of the display panel. The two ends of the fixing film exceeding the display panel are bent in a direction away from the display panel to form two side wings. A backlight unit is placed on the fixing film. The backlight unit and the display panel are respectively located at two respective sides of the fixing film. The two side wings stand at two respective sides of the backlight unit, and a length of the two side wings is greater than a thickness of the backlight unit. Parts of the two side wings exceeding the backlight unit are relatively bent, and the bent parts are attached to a bottom portion of the backlight unit. A bezel is connected to the covering plate, and the bezel exposes the two respective sides of the backlight unit.

According to an embodiment of the invention, the bezel includes a bottom plate and two side walls. The bottom plate covers the bottom portion of the backlight unit and the fixing film on the bottom portion of the backlight unit. The two side walls respectively stand at two respective sides of the bottom plate and cover the other two sides of the backlight unit. One end of each of the two side walls close to the covering plate extends and forms an ear-like portion, and the two ear-like portions are parallel to the covering plate and connected to the covering plate.

According to an embodiment of the invention, the assembling method further includes forming a pre-bending line on the two bent ends of the fixing film, respectively.

Based on the above, in the display module of the invention, the fixing film is attached to the display panel, and the fixing film wraps the backlight unit, so as to fix the relative position of the backlight unit and the display panel. Hence, supporting structures that hold the display panel do not need to be formed on the backlight unit. That is to say, convergence of light and light leakage caused by the supporting structures can be prevented.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A to FIG. 4G illustrate an assembling process of the display module depicted in FIG. 1.

DESCRIPTION OF EMBODIMENTS

Figure 1:
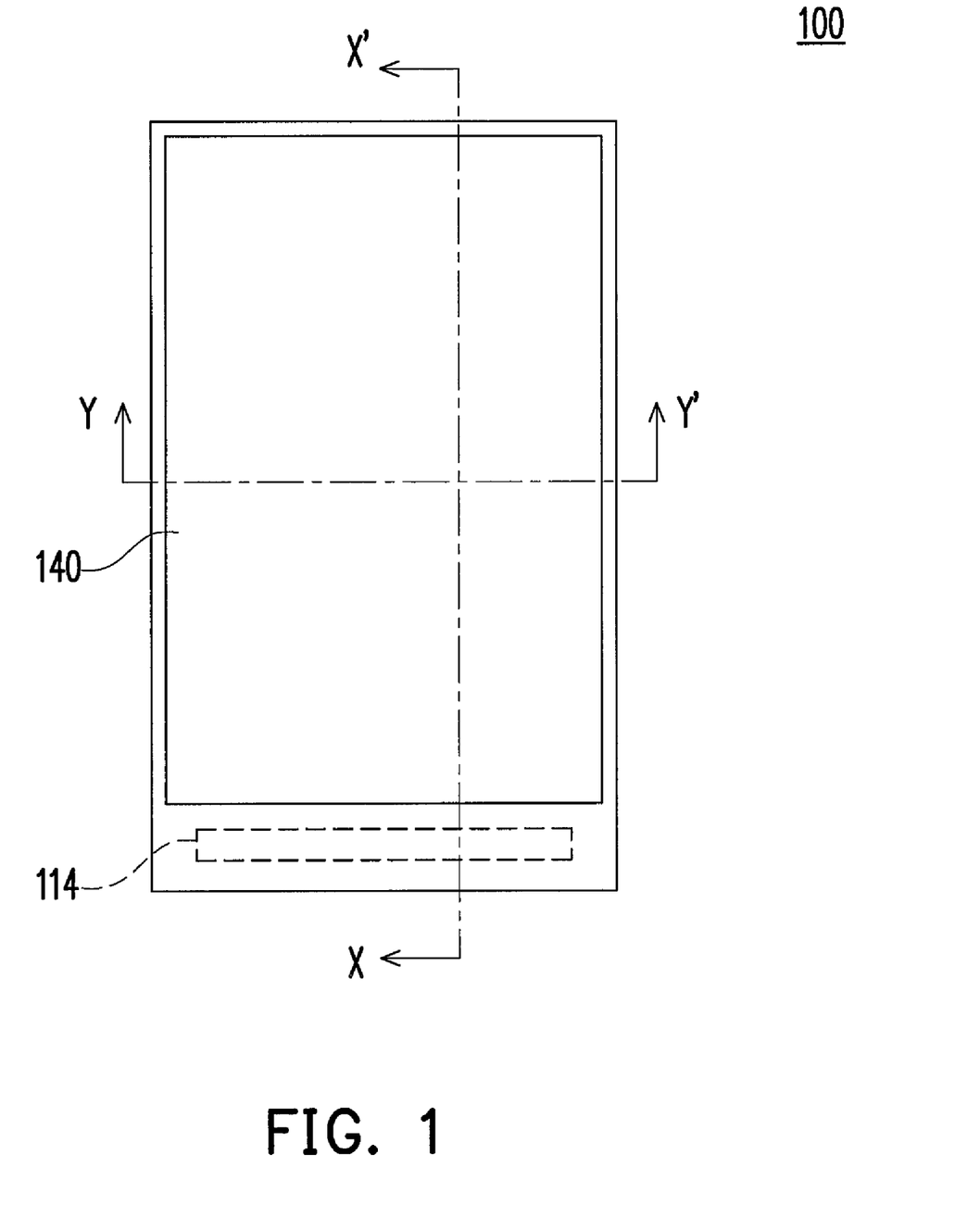
FIG. 1 is a top view illustrating a display module according to an embodiment of the invention.
Figure 2:
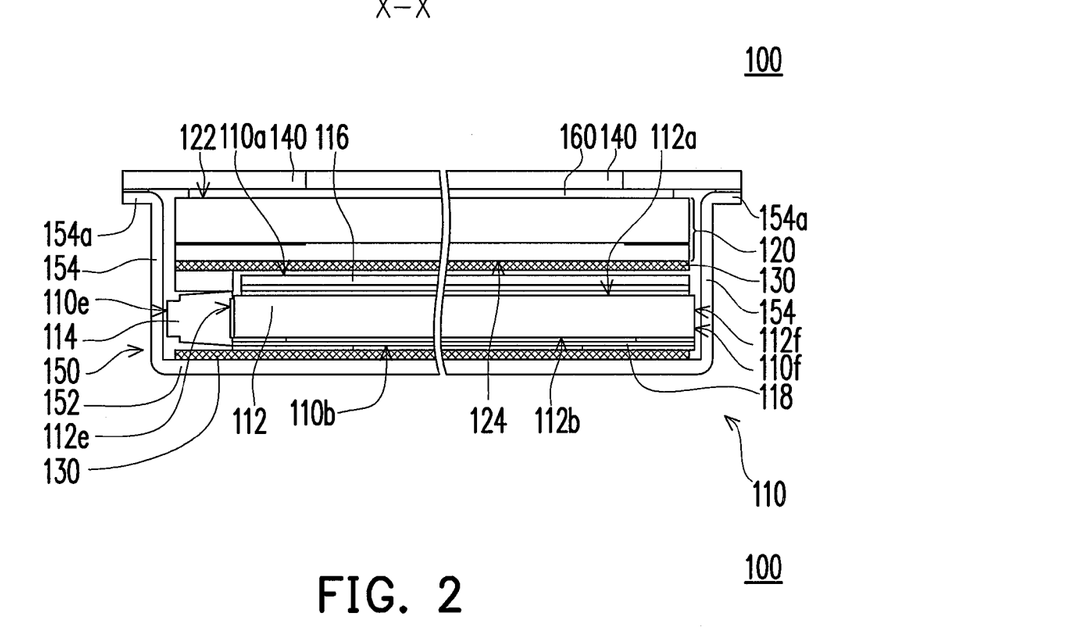
FIG. 2 is a cross-sectional view illustrating the display module depicted in FIG. 1 along a section X-X'.
Figure 3:
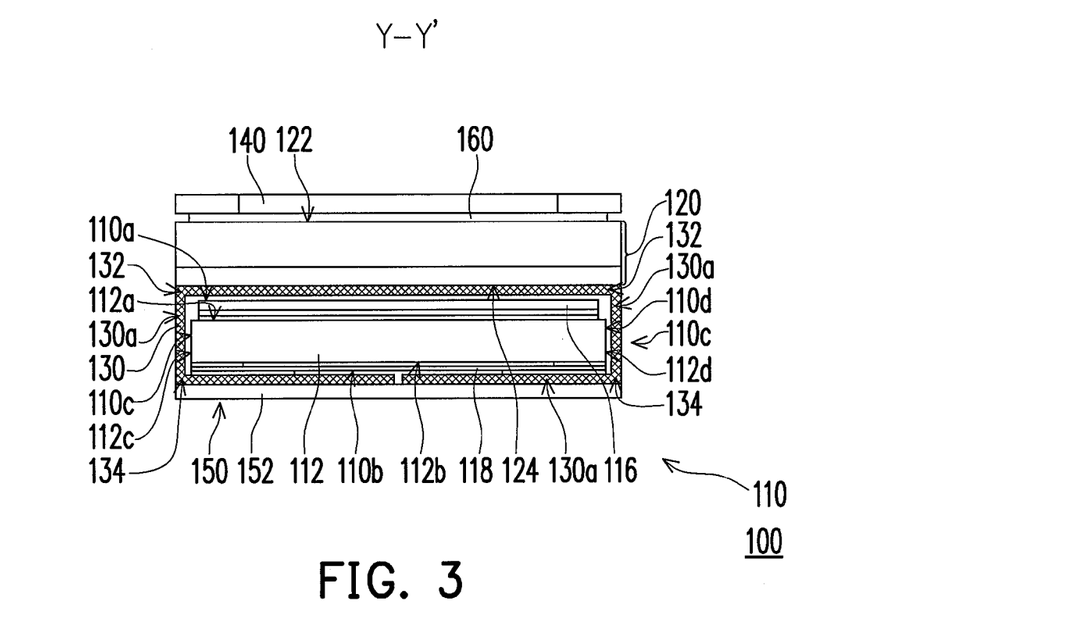
FIG. 3 is a cross-sectional view illustrating the display module depicted in FIG. 1 along a section Y-Y'.

FIG. 1 is a top view illustrating a display module according to an embodiment of the invention. FIG. 2 is a cross-sectional view illustrating the display module depicted in FIG. 1 along a section X-X'. FIG. 3 is a cross-sectional view illustrating the display module depicted in FIG. 1 along a section Y-Y'. With reference to FIG. 1 to FIG. 3, the display module 100 of this embodiment can be applied to a smart phone, and the display module 100 includes a backlight unit 110, a display panel 120, a fixing film 130, a covering plate, and a bezel 150.

The backlight unit 110 has a top portion 110a, a bottom portion 110b opposite to the top portion 110a, a first side 110c, a second side 110d, a third side 110e, and a fourth side 110f. The first side 110c, the second side 110d, the third side 110e, and the fourth side 110f are located between the top portion 110a and the bottom portion 110b. The first side 110c is opposite to the second side 110d, and the third side 110e is opposite to the fourth side 110f. The display panel 120 has a display surface 122 and a back surface 124 opposite to the display surface 122. The display panel 120 is located on the top portion 110a of the backlight unit 110, and the back surface 124 of the display panel 120 faces the top portion 110a. The fixing film 130 is attached to the back surface 124 of the display panel 120. Besides, the fixing film 130 extends toward the backlight unit 110 and wraps the first side 110c, the second side 110d, and the bottom portion 110b of the backlight unit 110. The covering plate 140 is disposed on the display surface 122 of the display panel 120. The bezel 150 is connected to the covering plate 140 and exposes the first side 110c and the second side 110d of the backlight unit 110.

As shown in FIG. 2, the fixing film 130 attached to the display panel 120 wraps the backlight unit 110 to fix the relative position of the backlight unit 110 and the display panel 120. Hence, supporting structures that hold the display panel 120 do not need to be formed on the backlight unit 110. That is to say, convergence of light and light leakage caused by the supporting structures can be prevented.

To be more specific, the bezel 150 of this embodiment includes a bottom plate 152 and two side walls 154. The bottom plate 152 covers the bottom portion 110b of the backlight unit 110 and the fixing film 130 on the bottom portion 110b of the backlight unit 110. The two side walls 154 are connected to the bottom plate 152 and respectively located at the third side 110e and the fourth side 110f of the backlight unit 110. One end of each of the two side walls 154 close to the covering plate 140 extends and forms an ear-like portion 154a. The two ear-like portions 154a are parallel to the covering plate 140 and connected to the covering plate 140, such that the bezel 150 is suitable for supporting the covering plate 140.

In this embodiment, the backlight unit 110 includes a light guide plate 112 and a light emitting device 114. The light guide plate 112 has a top surface 112a, a bottom surface 112b opposite to the top surface 112a, a first side 112c, a second side 112d, a third side 112e, and a fourth side 112f. The first side 112c is connected between the top surface 112a and the bottom surface 112b, and so are the second side 112d, the third side 112e, and the fourth side 112f. The first side 112c is opposite to the second side 112d, and the third side 112e is opposite to the fourth side 112f. The fixing film 130 wraps the first side 112c, the second side 112d, and the bottom surface 112b of the light guide plate 112, and the bezel 150 wraps the third side 112e, the fourth side 112f, and the bottom surface 112b of the light guide plate 112. The light emitting device 114 is, for instance, a light emitting diode (LED) light source and located between the third side 112e of the light guide plate 112 and a corresponding one of two side walls 154 of the bezel 150. Note that the bezel 150 of this embodiment does not wrap the third side 112e and the fourth side 112f of the light guide plate 112, such that the third side 112e and the fourth side 112f of the light guide plate 112 in the entire structure can have reduced thickness, and that the display module 100 can have the slim border design.

In addition, the display module 100 of this embodiment further includes a polarizer 160, and the backlight unit 110 further includes an optical film 116 and a reflector 118. The polarizer 160 is disposed between the display surface 122 of the display panel 120 and the covering plate 140. The optical film 116 is disposed between the top surface 112a of the light guide plate 112 and the fixing film 130. The reflector 118 is disposed between the bottom surface 112b of the light guide plate 112 and the fixing film 130.

Light emitted from the light emitting device 114 arrives at the optical film 116 after being reflected by the reflector 118 and transmitted by the light guide plate 112, and then the light sequentially passes through the optical film 116, the fixing film 130, the display panel 120, and the polarizer 160 and arrives at external surroundings, such that the display panel 120 displays images. In this embodiment, the fixing film 130 is a polarizer. However, in other embodiments of the invention, the fixing film 130 may not be a polarizer, and another polarizer is additionally disposed between the back surface 124 of the display panel 120 and the fixing film 130, which should not be construed as a limitation to the invention.

With reference to FIG. 3, in this embodiment, the fixing film 130 has a first bending portion 132 at an edge of the top portion 110a of the backlight unit 110 to form two side wings 130a respectively wrapping the first side 110c and the second side 110d of the backlight unit 110. Each of the two side wings 130a further has a second bending portion 134 at an edge of the bottom portion 110b of the backlight unit 110, and the second bending portions 134a are respectively attached to the bottom portion 110b of the backlight unit 110.

Figure 4A:
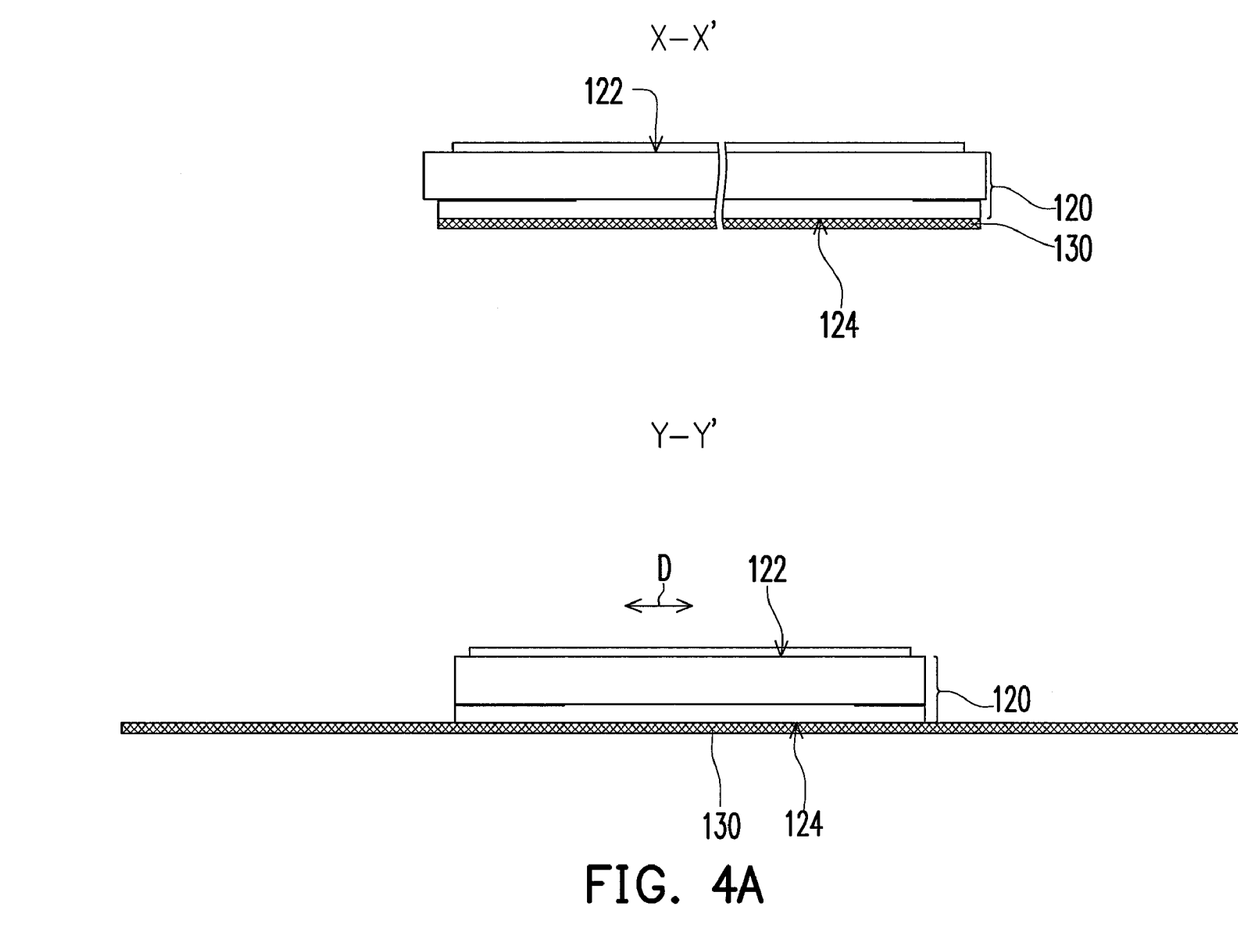

The assembling process of the display module 100 in this embodiment is described hereinafter with reference to the drawings. FIG. 4A to FIG. 4G illustrate an assembling process of the display module depicted in FIG. 1. With reference to FIG. 4A, a display panel 120 is provided, and a fixing film 130 is attached to the display panel 120. The display panel 120 has a display surface 122 and a back surface 124 opposite to the display surface 122. The fixing film 130 is attached to the back surface 124 of the display panel 120. A length of the fixing film 130 in a direction D is greater than a length of the display panel 120 in the direction D, such that two opposite ends of the fixing film 130 exceed the display panel 120.

Figure 4B:
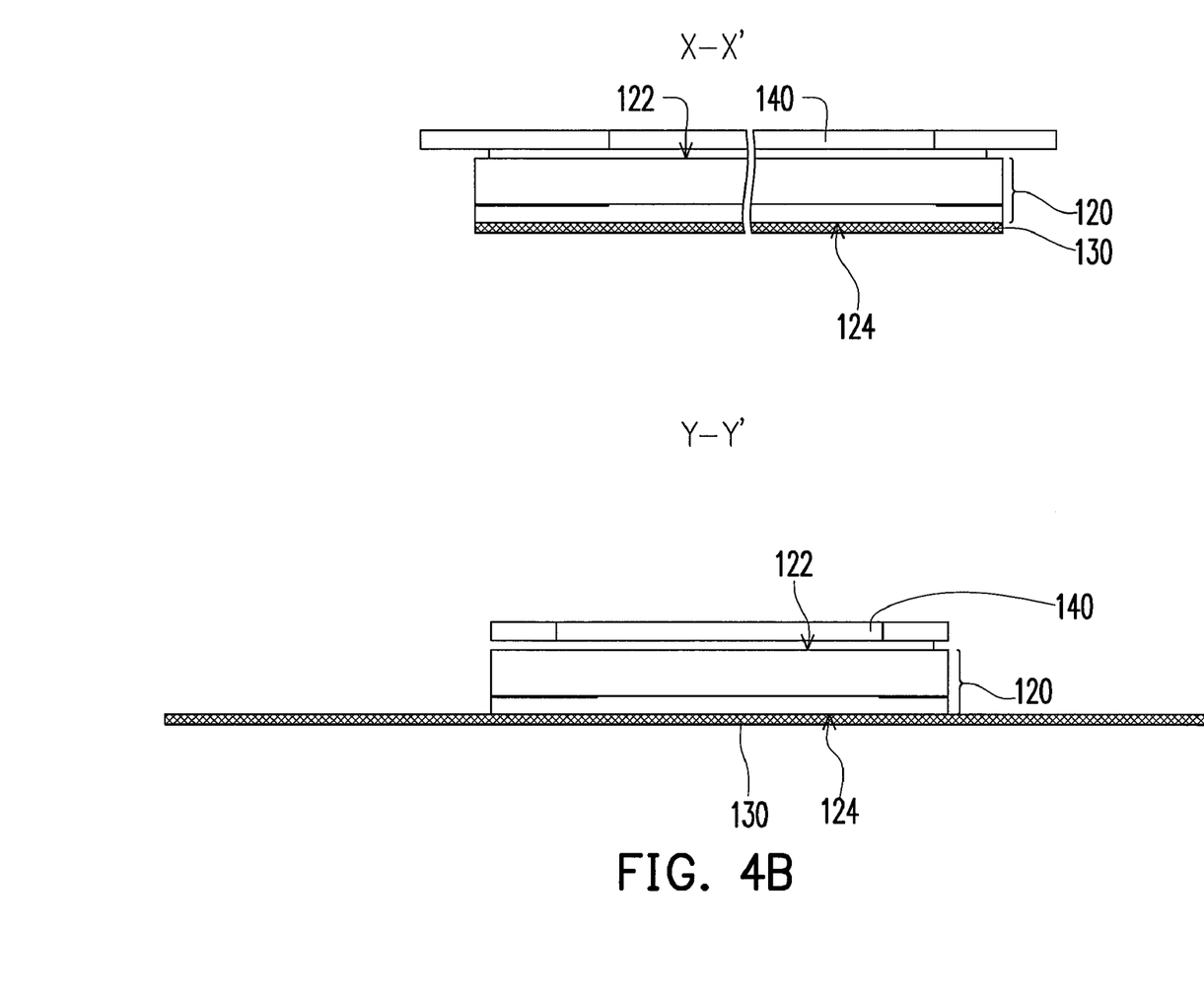
Figure 4C:
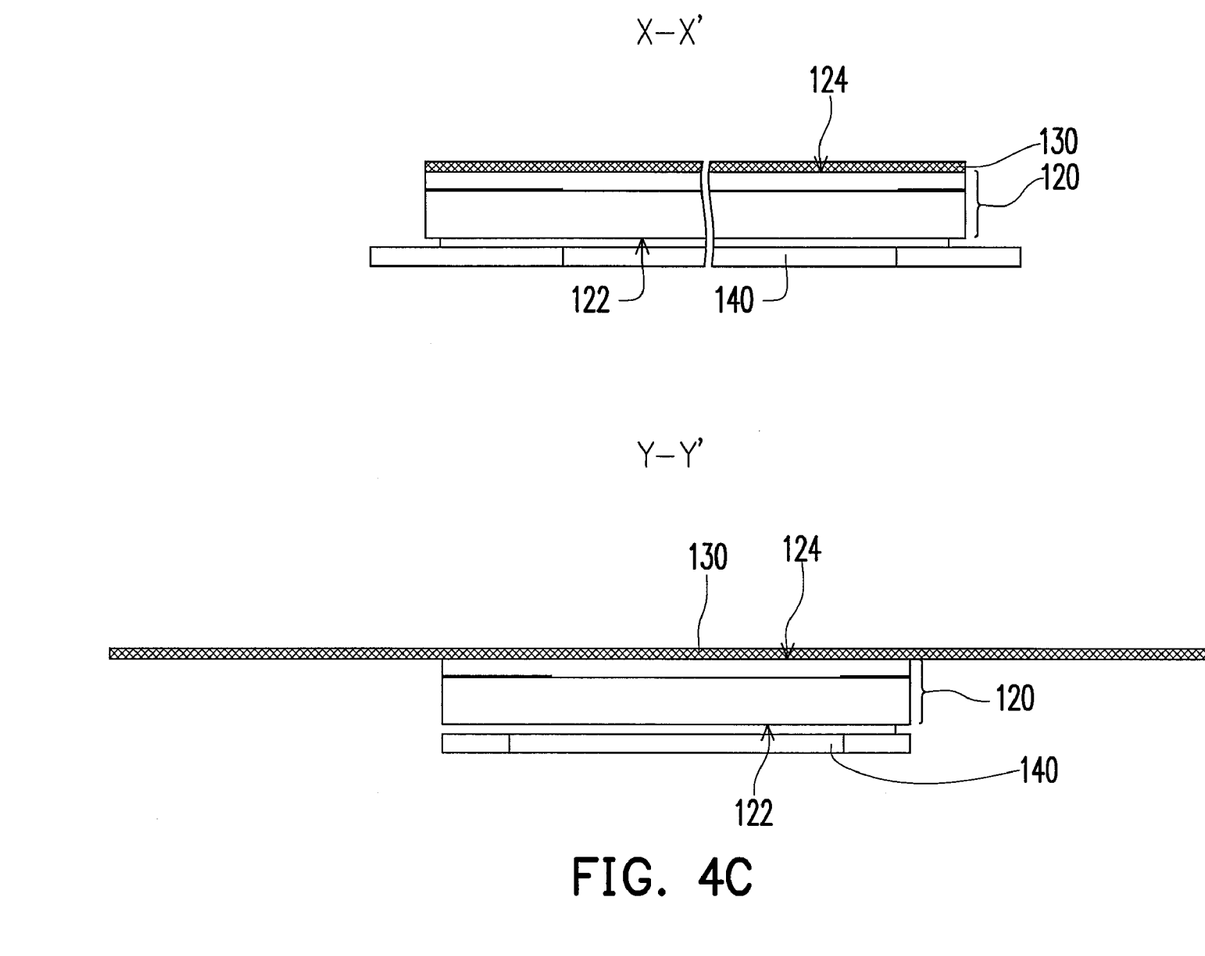
Figure 4D:
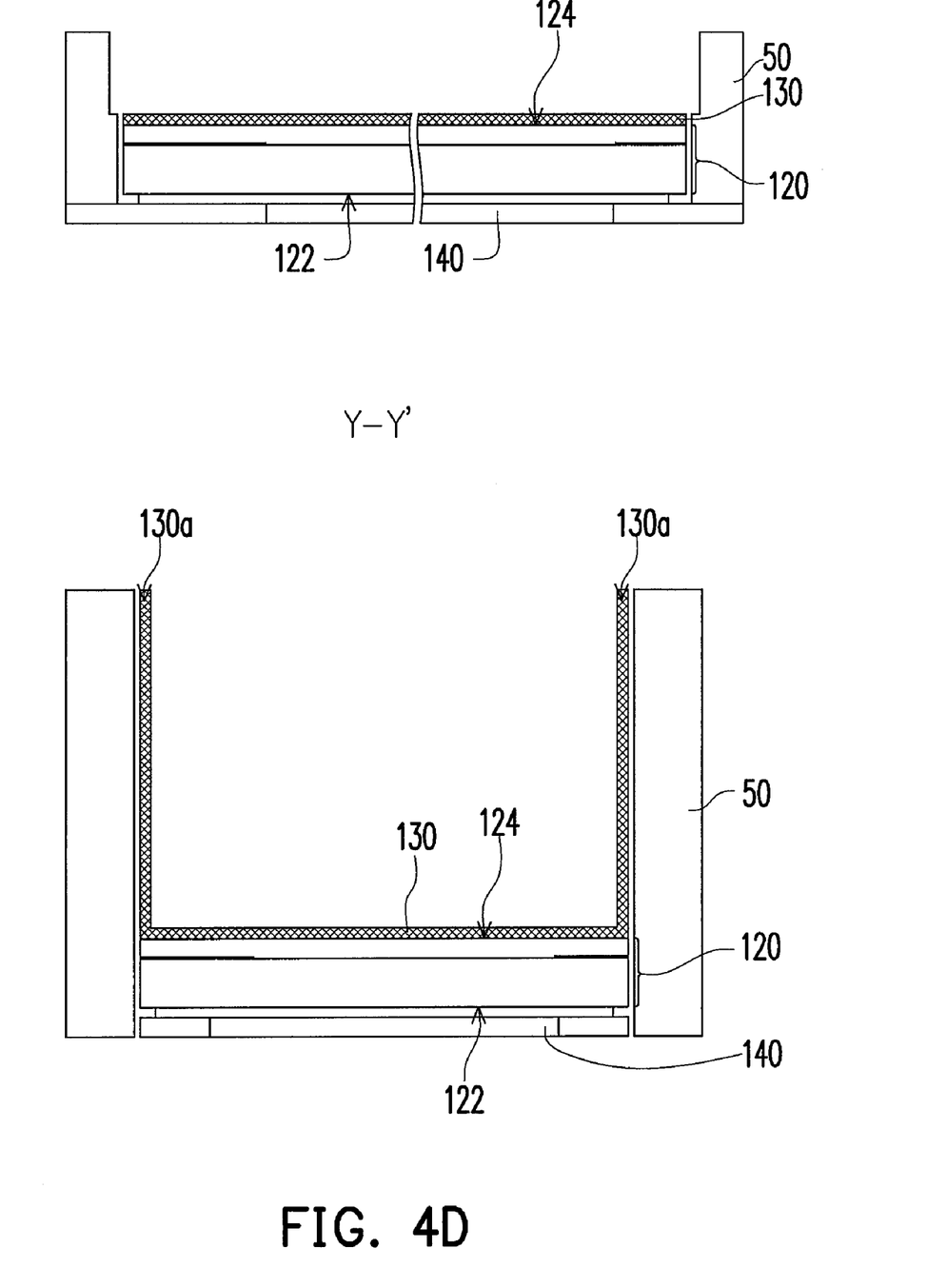

As shown in FIG. 4B, a covering plate 140 is placed on the display surface 122 of the display panel 120. Note that the order of placing the covering plate 140 and the fixing film 130 is not limited in the invention. That is to say, in other embodiments of the invention, the covering plate 140 can be placed on the display surface 122 of the display panel 120, and then the fixing film 130 is attached to the back surface 124 of the display panel 120. With reference to FIG. 4C, the structure shown in FIG. 4B is turned upside down, such that the fixing film 130 faces up. In FIG. 4D, the two ends of the fixing film 130 exceeding the display panel 120 are bent in a direction away from the display panel 120 to form two side wings 130a.

Figure 4E:
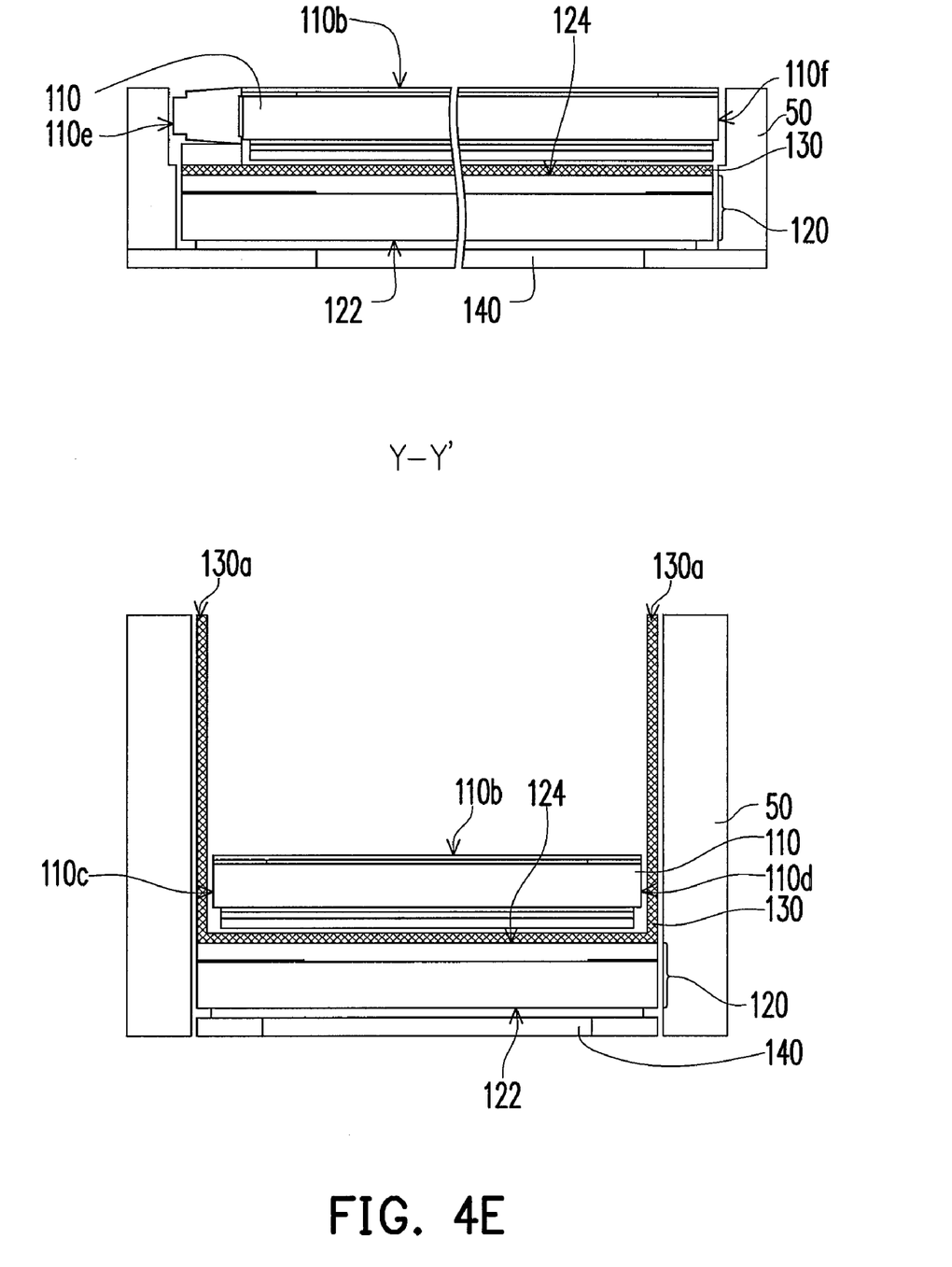
Figure 4F:
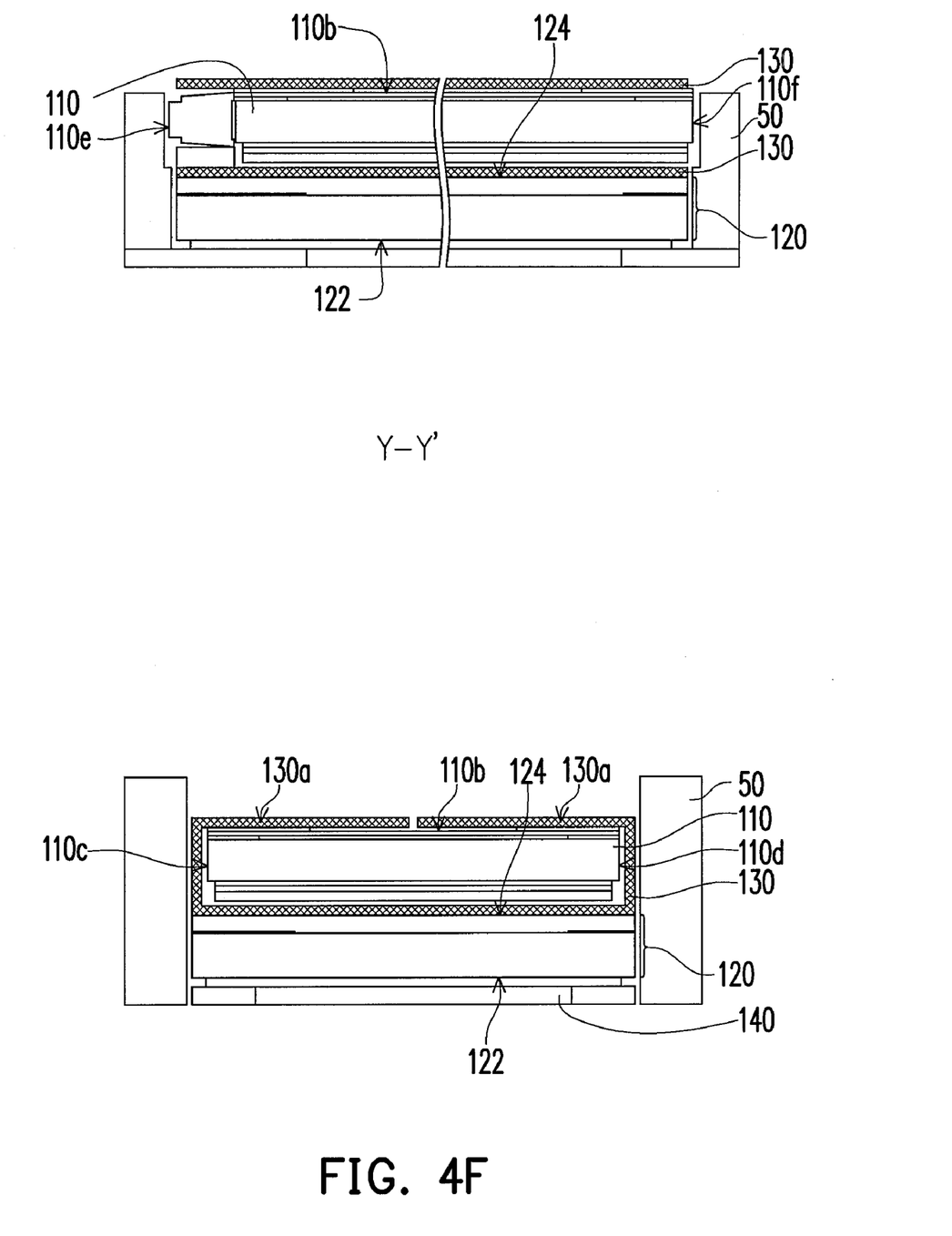

In FIG. 4E, a backlight unit 110 is placed on the fixing film 130. The backlight unit 110 and the display panel 120 are respectively located at two respective sides of the fixing film 130. The two side wings 130a stand at two respective sides (i.e., the first side 110c and the second side 110d) of the backlight unit 110, and a length of the two side wings 130a is greater than a thickness of the backlight unit 110. In FIG. 4F, parts of the two side wings 130a exceeding the backlight unit 110 are relatively bent, and the bent parts are attached to a bottom portion 110b of the backlight unit 110.

Figure 4G:
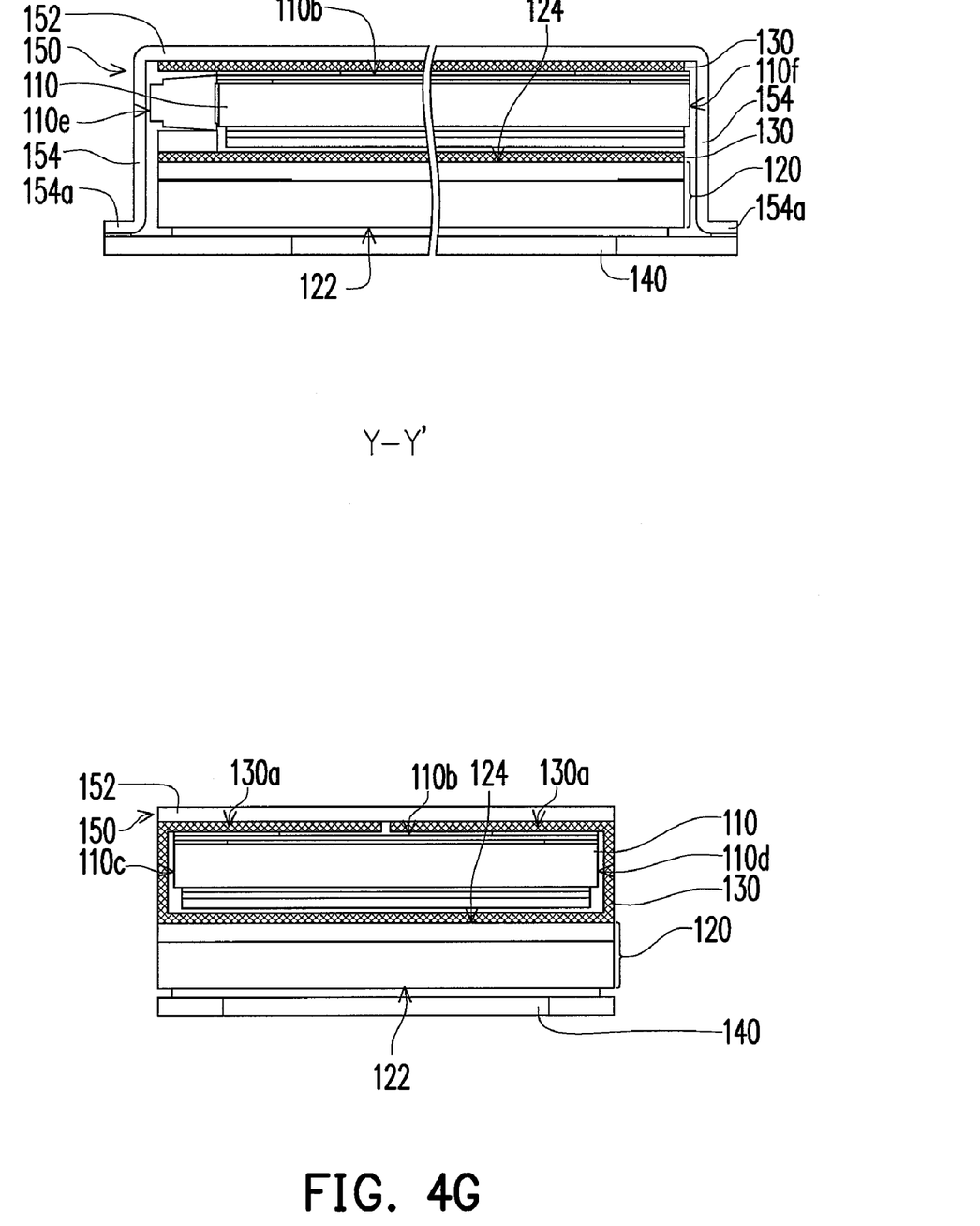

With reference to FIG. 4G, a bezel 150 is connected to the covering plate 140, and the bezel 150 exposes the two respective sides (i.e., the first side 110c and the second side 110d) of the backlight unit 110. The bezel 150 includes a bottom plate 152 and two side walls 154. The bottom plate 152 covers the bottom portion 110b of the backlight unit 110 and the fixing film 130 on the bottom portion 110b of the backlight unit 110. The two side walls 154 respectively stand at two respective sides of the bottom plate 152, i.e., at the first side 110c and the second side 110d of the backlight unit 110. Besides, the two side walls 154 respectively cover the other two sides (i.e., the third side 110e and the fourth side 110f) of the backlight unit 110. One end of each of the two side walls 154 close to the covering plate 140 extends and forms an ear-like portion 154a, and the two ear-like portions 154a are parallel to the covering plate 140 and connected to the covering plate 140. The structure shown in FIG. 4G is turned upside down, and the display module 100 illustrated in FIG. 2 and FIG. 3 is formed.

In particular, after the fixing film 130 is bent to form the two side wings 130a, as shown in FIG. 4D, the display panel 120 and the bent fixing film 130 can be together placed in a fixture 50. The fixture 50 surrounds the display panel 120 and the fixing film 130, and a space within which the backlight unit 110 is placed in subsequent steps is defined by the two side wings 130a and the fixture 50. Components of the display module are positioned by the fixture 50, and therefore the components are not unexpectedly shifted in the assembling process depicted in FIG. 4D to FIG. 4F. As indicated in FIG. 4F and FIG. 4G, parts of the two side wings 130a exceeding the backlight unit 110 are relatively bent and attached to the backlight unit 110, and then the fixture 50 can be removed, so as to further arrange the bezel 150.

Figure 5:
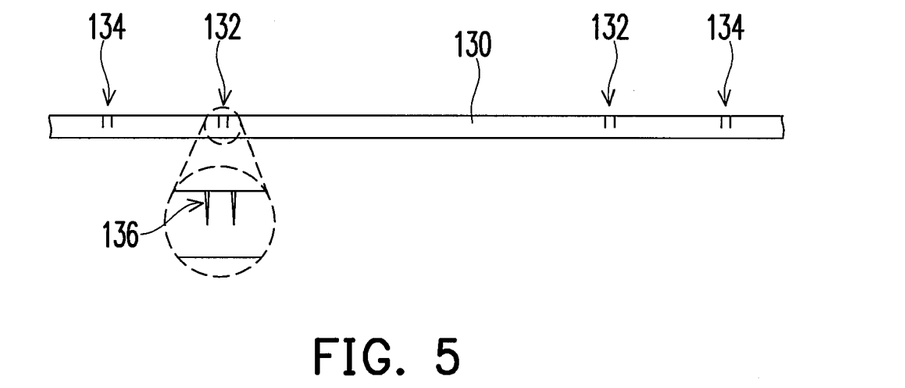
FIG. 5 is a schematic view illustrating a fixing film depicted in FIG. 4C.

FIG. 5 is a schematic view illustrating a fixing film depicted in FIG. 4C. As shown in FIG. 5, to be more specific, the assembling method of the display module 100 in this embodiment further includes forming a pre-bending line 136 on each of the two bent ends (i.e., the first bending portion 132 and the second bending portion 134 as shown in FIG. 3) of the fixing film 130, respectively, and thereby users can easily bend the fixing film 130 in the steps shown in FIG. 4C to FIG. 4D and in FIG. 4E to FIG. 4F. The pre-bending lines 136 of this embodiment include cutting notches that respectively extend along the first bending portion 132 and the second bending portion 134 into the fixing film 130 at a certain depth without penetrating the fixing film 130, and the depth is, for instance, less than or equal to ½ of a total thickness of the fixing film 130. The cutting notches are formed by means of a knife with a shape of letter K. Since the cutting notches do not penetrate the fixing film 130, light leakage can be prevented. Types of the pre-bending lines 136 are not limited in the invention and are exemplified below with reference to FIG. 6.

Figure 6:
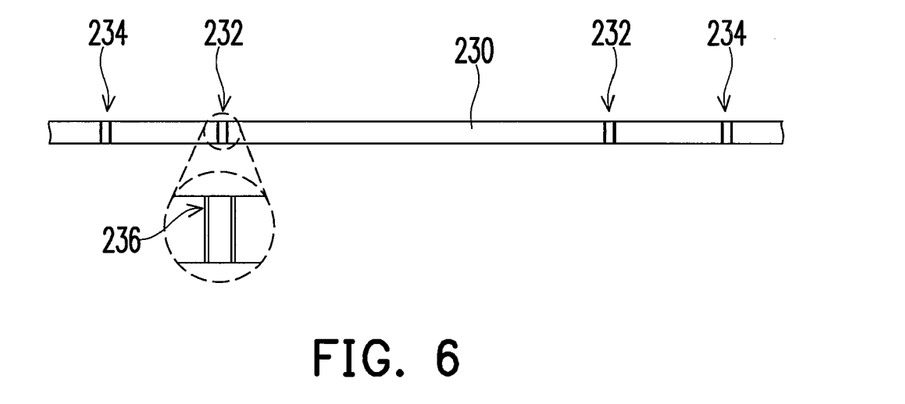
FIG. 6 is a schematic view illustrating a fixing film according to another embodiment of the invention.
Figure 7:
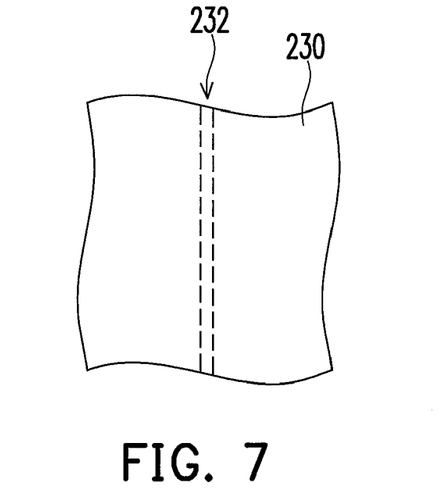
FIG. 7 is a partial top view illustrating a fixing film depicted in FIG. 6.

FIG. 6 is a schematic view illustrating a fixing film according to another embodiment of the invention. FIG. 7 is a partial top view illustrating a fixing film depicted in FIG. 6. As indicated in FIG. 6 and FIG. 7, pre-bending lines 236 are respectively formed at the first bending portion 232 and the second pending portion 234 of the fixing film 230 in this embodiment. Each of the pre-bending lines 236 includes a plurality of cutting slots arranged along the first bending portion 232 and the second bending portion 234. In FIG. 6, the number of the cutting slots in each of the pre-bending lines 236 is two, and the cutting slots penetrate the fixing film 230 and are non-continuous cutting slots.

In light of the foregoing, the fixing film attached to the display panel wraps the backlight unit in the display module of the invention, so as to fix the relative position of the backlight unit and the display panel. The fixing film can be a polarizer originally attached to the display panel or a film additionally formed. Besides, one end of each of the two side walls of the bezel close to the covering plate extends and forms an ear-like portion. The two ear-like portions are parallel to the covering plate, such that the bezel is suitable for supporting the covering plate by means of the two ear-like portions. Thereby, supporting structures that hold the display panel do not need to be formed on the backlight unit. In other words, convergence of light and light leakage caused by the supporting structures can be prevented. On the other hand, the bezel does not wrap the third side and the fourth side of the light guide plate, such that the third side and the fourth side of the light guide plate in the entire structure can have reduced thickness, and that the display module can have the slim border design.

It will be apparent to those skilled in the art that various modifications and variations can be made to the invention without departing from the scope or spirit of the invention. In view of the foregoing, it is intended that the invention cover modifications and variations of this invention provided they fall within the scope of the following claims and their equivalents.

What is claimed is:

1. A display module comprising:
   a backlight unit having a top portion, a bottom portion opposite to the top portion, a first side, a second side, a third side, and a fourth side, the first side, the second side, the third side, and the fourth side being located between the bottom portion and the top portion, the first side being opposite to the second side, the third side being opposite to the fourth side;
   a display panel having a display surface and a back surface opposite to the display surface, the display panel being located on the top portion of the backlight unit, the back surface of the display panel facing the top portion;
   a fixing film attached to the back surface of the display panel, the fixing film extending toward the backlight unit and wrapping the first side, the second side, and the bottom portion of the backlight unit;
   a covering plate disposed on the display surface of the display panel; and
   a bezel connected to the covering plate and exposing the first side and the second side of the backlight unit.

2. The display module as claimed in claim 1, the bezel comprising:
   a bottom plate covering the bottom portion of the backlight unit and the fixing film on the bottom portion of the backlight unit; and
   two side walls connected to the bottom plate and respectively located at the third side and the fourth side of the backlight unit, wherein one end of each of the two side walls close to the covering plate extends and forms an ear-like portion, and the two ear-like portions are parallel to the covering plate and connected to the covering plate.

3. The display module as claimed in claim 1, the backlight unit comprising:
   a light guide plate having a top surface, a bottom surface opposite to the top surface, a first side, a second side, a third side, and a fourth side, the first side, the second side, the third side, and the fourth side being connected between the top surface and the bottom surface, the first side being opposite to the second side, the third side being opposite to the fourth side, wherein the fixing film wraps the first side, the second side, and the bottom surface of the light guide plate, and the bezel wraps the third side, the fourth side, and the bottom surface of the light guide plate; and
   a light emitting device located between the third side of the light guide plate and a corresponding one of two side walls of the bezel.

4. The display module as claimed in claim 3, wherein the backlight unit further comprises an optical film disposed between the top surface of the light guide plate and the fixing film.

5. The display module as claimed in claim 3, wherein the backlight unit further comprises a reflector disposed between the bottom surface of the light guide plate and the fixing film.

6. The display module as claimed in claim 1, wherein the fixing film has a first bending portion at an edge of the top portion of the backlight unit to form two side wings respectively wrapping the first side and the second side of the backlight unit, each of the two side wings further has a second bending portion at an edge of the bottom portion of the backlight unit, and the second bending portions are respectively attached to the bottom portion of the backlight unit.

7. The display module as claimed in claim 1, wherein the first bending portion includes a first pre-bending line, and the second bending portion includes a second pre-bending line.

8. The display module as claimed in claim 7, wherein the first pre-bending line comprises a first cutting notch extending along the first bending portion into the fixing film at a first depth without penetrating the fixing film, the first depth is less than or equal to ½ of a total thickness of the fixing film, the second pre-bending line comprises a second cutting notch extending along the second bending portion into the fixing film at a second depth without penetrating the fixing film, and the second depth is less than or equal to ½ of the total thickness of the fixing film.

9. The display module as claimed in claim 7, wherein the first pre-bending line comprises a plurality of first cutting slots arranged along the first bending portion, the first cutting slots penetrate the fixing film, the second pre-bending line comprises a plurality of second cutting slots arranged along the second bending portion, and the second cutting slots penetrate the fixing film.

10. The display module as claimed in claim 1, further comprising a first polarizer disposed between the display surface of the display panel and the covering plate.

11. The display module as claimed in claim 10, further comprising a second polarizer disposed between the back surface of the display panel and the fixing film.

12. The display module as claimed in claim 1, wherein the fixing film is a polarizer.

13. An assembling method of a display module, comprising:
   providing a display panel, the display panel having a display surface and a back surface opposite to the display surface;
   attaching a fixing film to the back surface of the display panel, a length of the fixing film in a direction being greater than a length of the display panel in the direction, such that two opposite ends of the fixing film exceed the display panel;
   placing a covering plate on the display surface of the display panel;
   bending the two ends of the fixing film exceeding the display panel in a direction away from the display panel to form two side wings;
   placing a backlight unit on the fixing film, the backlight unit and the display panel being respectively located at two respective sides of the fixing film, the two side wings standing at two respective sides of the backlight unit, a length of the two side wings being greater than a thickness of the backlight unit;

relatively bending parts of the two side wings exceeding the backlight unit and attaching the bent parts to a bottom portion of the backlight unit; and connecting a bezel to the covering plate, the bezel exposing the two respective sides of the backlight unit.

14. The assembling method as claimed in claim 13, wherein the bezel comprises a bottom plate and two side walls, the bottom plate covers the bottom portion of the backlight unit and the fixing film on the bottom portion of the backlight unit, the two side walls respectively stand at two respective sides of the bottom plate and cover the other two sides of the backlight unit, one end of each of the two side walls close to the covering plate extends and forms an ear-like portion, the two ear-like portions are parallel to the covering plate and connected to the covering plate.

15. The assembling method as claimed in claim 13, further comprising forming a pre-bending line on the two bent ends of the fixing film, respectively.

* * * * *